US012787952B2

(12) United States Patent
Sweeney et al.

(10) Patent No.: US 12,787,952 B2
(45) Date of Patent: Nov. 10, 2026

(54) IRRIGATION SPRINKLER IDENTIFICATION

(71) Applicant: IrriGreen, Inc., Edina, MN (US)

(72) Inventors: John Paul Sweeney, Eden Prairie, MN (US); Seth Sawyer Hammond, Excelsior, MN (US); Ryan Lee Daulton, Minnetonka, MN (US); Gary Klinefelter, Eden Prairie, MN (US)

(73) Assignee: IRRIGREEN, INC., Edina, MN (US)

(*) Notice: Subject to any disclaimer, the term of this patent is extended or adjusted under 35 U.S.C. 154(b) by 101 days.

(21) Appl. No.: 18/664,449

(22) Filed: May 15, 2024

(65) Prior Publication Data

US 2025/0351788 A1 Nov. 20, 2025

(51) Int. Cl.
*A01G 25/16* (2006.01)
*B05B 1/30* (2006.01)
*B05B 12/04* (2006.01)

(52) U.S. Cl.
CPC ........... *A01G 25/162* (2013.01); *A01G 25/16* (2013.01); *B05B 1/306* (2013.01); *B05B 12/04* (2013.01)

(58) Field of Classification Search
None
See application file for complete search history.

(56) References Cited

U.S. PATENT DOCUMENTS

| | | | |
|---|---|---|---|
| 1,102,354 | A | 7/1914 | Pougnet |
| 2,884,202 | A | 4/1959 | Smith |
| 3,149,784 | A | 9/1964 | Skidgel |
| 3,452,930 | A | 7/1969 | Karbo |
| 3,802,627 | A | 4/1974 | Seckler et al. |
| 3,952,954 | A | 4/1976 | Taylor |
| 3,960,327 | A | 6/1976 | Olson |
| 4,033,508 | A | 7/1977 | Jacobi et al. |
| 4,186,880 | A | 2/1980 | Jacobi et al. |

(Continued)

FOREIGN PATENT DOCUMENTS

| | | | |
|---|---|---|---|
| DE | 102005058798 | A1 | 6/2007 |
| EP | 0 301 367 | A2 | 7/1988 |

(Continued)

OTHER PUBLICATIONS

U.S. Appl. No. 61/365,600, filed Jul. 19, 2010.

(Continued)

*Primary Examiner* — Phutthiwat Wongwian
*Assistant Examiner* — Jacek Lisowski
(74) *Attorney, Agent, or Firm* — Westman, Champlin & Koehler, P.A.

(57) ABSTRACT

A sprinkler includes a base having an interior cavity, a fluid flow path extending through the interior cavity, a valve, a nozzle head, a motorized rotator, memory containing a sprinkler identification code that uniquely identifies the sprinkler, and a transmitter. The valve includes a valve body and a valve element configured to move relative to the valve body to various positions to control a water flow through the fluid flow path. The nozzle head is supported by the base and includes at least one nozzle configured to discharge water received through the fluid flow path. The motorized rotator is configured to rotate the nozzle head about an axis. The transmitter is contained in the interior cavity and configured to wirelessly broadcast the sprinkler identification code.

18 Claims, 8 Drawing Sheets

(56) References Cited

U.S. PATENT DOCUMENTS

| | | | |
|---|---|---|---|
| 4,249,698 | A | 2/1981 | Smith et al. |
| 4,277,029 | A | 7/1981 | Rabitsch |
| 4,522,338 | A | 6/1985 | Williams |
| 4,530,465 | A | 7/1985 | Gauchet et al. |
| 4,566,633 | A | 1/1986 | Rinkewich |
| 4,613,077 | A | 9/1986 | Aronson |
| 4,626,984 | A | 12/1986 | Unruh et al. |
| 4,646,224 | A | 2/1987 | Ransburg et al. |
| 4,700,897 | A | 10/1987 | Smith et al. |
| 4,714,635 | A | 12/1987 | Mochizuki et al. |
| 4,760,547 | A | 7/1988 | Duxbury |
| 4,799,142 | A | 1/1989 | Waltzer et al. |
| 4,809,910 | A | 3/1989 | Meyer |
| 5,280,854 | A | 1/1994 | Das |
| 5,475,614 | A | 12/1995 | Tofte et al. |
| 5,769,322 | A | 6/1998 | Smith |
| 7,360,413 | B2 | 4/2008 | Jeffries et al. |
| 7,398,139 | B1 | 7/2008 | Woytowitz |
| 7,400,944 | B2 | 7/2008 | Bailey et al. |
| 7,403,840 | B2 | 7/2008 | Moore et al. |
| 7,406,363 | B2 | 7/2008 | Doering et al. |
| 7,412,303 | B1 | 8/2008 | Porter et al. |
| 7,419,105 | B2 | 9/2008 | Wang et al. |
| 7,421,317 | B2 | 9/2008 | Christiansen |
| 7,458,521 | B2 | 12/2008 | Ivans |
| 7,494,070 | B2 | 2/2009 | Collins |
| 7,500,620 | B2 | 3/2009 | Cordua |
| 7,503,338 | B2 | 3/2009 | Harrington et al. |
| 7,584,023 | B1 | 9/2009 | Palmer et al. |
| 7,590,471 | B2 | 9/2009 | Jacobsen et al. |
| 7,617,992 | B2 | 11/2009 | Ivans |
| 7,631,813 | B1 | 12/2009 | Lichte et al. |
| 7,708,206 | B2 | 5/2010 | Ivans |
| 7,726,587 | B2 | 6/2010 | Markley et al. |
| 7,789,321 | B2 | 9/2010 | Hitt |
| 7,792,612 | B2 | 9/2010 | Kah, Jr. |
| 7,810,515 | B2 | 10/2010 | Nies et al. |
| 7,822,511 | B2 | 10/2010 | Ivans |
| 7,823,804 | B2 | 11/2010 | Cordua |
| 7,877,168 | B1 | 1/2011 | Porter et al. |
| 7,883,027 | B2 | 2/2011 | Fekete |
| 7,917,249 | B2 | 3/2011 | Jacobsen et al. |
| 7,988,071 | B2 | 8/2011 | Bredberg |
| 8,010,238 | B2 | 8/2011 | Ensworth et al. |
| 8,019,482 | B2 | 9/2011 | Sutardja |
| 8,024,075 | B2 | 9/2011 | Fekete |
| 8,035,491 | B2 | 10/2011 | Banks |
| 8,096,523 | B2 | 1/2012 | Dolenti et al. |
| 8,104,498 | B2 | 1/2012 | Dresselhaus et al. |
| 8,104,993 | B2 | 1/2012 | Hitt et al. |
| 8,113,443 | B2 | 2/2012 | Zur |
| 8,132,592 | B2 | 3/2012 | Harrington et al. |
| 8,136,742 | B2 | 3/2012 | Cordua |
| 8,145,332 | B2 | 3/2012 | Sutardja et al. |
| 8,160,750 | B2 | 4/2012 | Weller |
| 8,185,248 | B2 | 5/2012 | Ensworth et al. |
| 8,193,930 | B2 | 6/2012 | Petite et al. |
| 8,209,061 | B2 | 6/2012 | Palmer et al. |
| 8,215,570 | B2 | 7/2012 | Hitt |
| 8,220,723 | B2 | 7/2012 | Clark |
| 8,224,493 | B2 | 7/2012 | Walker et al. |
| 8,275,309 | B2 | 9/2012 | Woytowitz |
| 8,279,080 | B2 | 10/2012 | Pitchford et al. |
| 8,302,882 | B2 | 11/2012 | Nelson et al. |
| 8,328,117 | B2 | 12/2012 | Bredberg |
| 9,643,196 | B2 | 5/2017 | Klinefelter et al. |
| 10,232,395 | B2 | 3/2019 | Klinefelter et al. |
| 10,654,062 | B2 | 5/2020 | Klinefelter et al. |
| 2002/0125338 | A1 | 9/2002 | Collins |
| 2002/0159070 | A1 | 10/2002 | Maeda et al. |
| 2003/0010842 | A1 | 1/2003 | Kah, Jr. |
| 2003/0067889 | A1 | 4/2003 | Petite |
| 2003/0120393 | A1 | 6/2003 | Bailey et al. |
| 2005/0077401 | A1 | 4/2005 | Sinden et al. |
| 2005/0107924 | A1 | 5/2005 | Bailey et al. |
| 2006/0027676 | A1 | 2/2006 | Buck et al. |
| 2006/0049271 | A1 | 3/2006 | Hitt |
| 2006/0131442 | A1 | 6/2006 | Ivans |
| 2006/0144957 | A1 | 7/2006 | Jacobsen et al. |
| 2007/0043454 | A1 | 2/2007 | Sonnenberg |
| 2007/0106426 | A1 | 5/2007 | Ensworth et al. |
| 2007/0179674 | A1 | 8/2007 | Ensworth et al. |
| 2007/0191991 | A1 | 8/2007 | Addink |
| 2007/0221750 | A1 | 9/2007 | Roberts |
| 2009/0065606 | A1 | 3/2009 | Lee et al. |
| 2009/0076659 | A1 | 3/2009 | Ensworth et al. |
| 2009/0108088 | A1 | 4/2009 | Bredberg |
| 2009/0138132 | A1 | 5/2009 | Collins |
| 2009/0204265 | A1 | 8/2009 | Hackett |
| 2010/0012746 | A1 | 1/2010 | Zur |
| 2010/0042263 | A1 | 2/2010 | Jacobsen et al. |
| 2010/0044465 | A1 | 2/2010 | Lichte et al. |
| 2011/0049260 | A1 | 3/2011 | Palmer et al. |
| 2012/0018532 | A1 | 1/2012 | Nelson et al. |
| 2012/0037722 | A1 | 2/2012 | Shahak et al. |
| 2012/0193447 | A1 | 8/2012 | Bredberg |
| 2013/0110293 | A1 | 5/2013 | Illig |
| 2013/0126635 | A1 | 5/2013 | Klinefelter et al. |
| 2014/0005843 | A1* | 1/2014 | Thomas ................... H01Q 1/04 343/719 |
| 2014/0110498 | A1 | 4/2014 | Nelson et al. |
| 2014/0131469 | A1 | 5/2014 | Henry et al. |
| 2023/0148498 | A1* | 5/2023 | Heaney ................... B05B 1/267 700/284 |
| 2023/0247950 | A1* | 8/2023 | Gaulin ................... A01G 25/02 405/36 |
| 2024/0176467 | A1* | 5/2024 | Ramsey ................ G06F 3/0482 |

FOREIGN PATENT DOCUMENTS

| | | | |
|---|---|---|---|
| GB | 2087566 | A | 5/1982 |
| WO | 9702897 | A1 | 1/1997 |
| WO | 2004064498 | A1 | 8/2004 |
| WO | 2006060465 | A2 | 6/2006 |
| WO | 2007011999 | A2 | 1/2007 |
| WO | 2008062398 | A1 | 5/2008 |
| WO | 2008084049 | A2 | 7/2008 |
| WO | 2010009016 | A1 | 1/2010 |
| WO | 2012012318 | A2 | 1/2012 |
| WO | 2012012318 | A3 | 1/2012 |
| WO | 2013151724 | A1 | 10/2013 |
| WO | 2017015118 | A1 | 1/2017 |

OTHER PUBLICATIONS

U.S. Appl. No. 61/605,374, filed Mar. 1, 2012.

International Search Report and Written Opinion from PCT/US2011/044337, dated Mar. 29, 2012.

Turbine Rotor Sprinkler article, http://www.gilmour.com/Watering/Hose-End/Sprinklers/Medium-Coverage/Turbine-Rotor, accessed on Apr. 21, 2010. Gilmour Group 2010 (2 pages).

Examiner's First Report from Australian Patent Application No. 2013200998, dated Dec. 5, 2014.

First Office Action from European patent application No. 11738361.2, dated Sep. 14, 2016.

Communication pursuant to Article 94(3) EPC from European Application No. 11738361.2, dated May 14, 2018.

International Search Report and Written Opinion from PCT/US2016/042511, dated Oct. 25, 2016.

Examiner's First Report from Australian Patent Application No. 2013243915, dated Jun. 22, 2015.

EPO Communication from EP Application No. 13716503.1, dated Nov. 19, 2014.

International Search Report and Written Opinion from PCT/US2013/031503, dated Jun. 25, 2013.

Extended European Search Report dated Oct. 6, 2025 for corresponding European Application No. 25176008.8.

* cited by examiner 124 202 120 204 240

| SPRINKLER ID CODE | LOCATION DESCRIPTION | SUB-GROUP |
|---|---|---|
| 001 | FRONT YARD EAST CORNER | C |
| 002 | BACK YARD CENTER | A |
| 003 | EAST SIDE OF HOUSE | C |
| 004 | WEST SIDE OF HOUSE | B |
| ⋮ | ⋮ | ⋮ |
| N | FRONT YARD WEST CORNER | A |

200

FIG. 8

IRRIGATION SPRINKLER IDENTIFICATION

FIELD

Embodiments of the present disclosure relate to sprinklers and, more specifically, to the identification of individual "smart" sprinklers after their installation within the ground.

BACKGROUND

Irrigation sprinklers are known for watering circular patterns or arc segments of a circular pattern. Typical passive irrigation sprinklers discharge a single rotary water stream that is rotated in a circle around a vertical rotational axis. This water stream is thrown by a sprinkler nozzle mounted in the peripheral sidewall of the nozzle head at an upward angle to direct the water a radial distance from the nozzle. The radial distance is typically set through a mechanical adjustment to the nozzle head. Such passive irrigation sprinklers perform watering operations that are solely based on the period of the water flow to the sprinkler.

Irrigation systems utilizing passive sprinklers are organized into various watering zones, each of which corresponds to a fluid pathway that is controlled by a single valve. The irrigation controller activates an individual watering zone by opening the corresponding valve, and deactivates the watering zone by closing the valve. Thus, the plumbing of the system determines the sprinklers that are contained in each watering zone.

Modern "smart" sprinklers perform watering operations in accordance with a watering program by controlling a flow rate at which water is discharged through the nozzle head for a given angular orientation of the nozzle head using a valve of the sprinkler. This allows the smart sprinkler to perform precise watering operations over an area having a non-circular perimeter, while avoiding watering areas that should not be watered (e.g., sidewalk, driveway, structure, etc.). As a result, smart sprinklers perform substantially more efficient watering operations than conventional passive sprinklers, resulting in large water savings. Examples of such smart sprinklers are described in U.S. Pat. Nos. 10,232,395 and 10,654,062, which issued to Irrigreen, Inc., and are incorporated herein by reference in their entirety.

The installation of an irrigation system utilizing smart sprinklers requires the matching of one of the installed sprinklers to a desired watering program. This generally requires the installer to identify a location of each sprinkler and, based on each sprinkler's location, assign the corresponding watering program to the sprinkler in a main control program.

Conventional techniques for identifying installed smart sprinklers include activating each sprinkler one at a time using a controller of the system, such as by opening the valve of the sprinkler to cause a water stream to be discharged, or by activating a motorized rotator to drive rotation of the nozzle head. Both of these techniques require the operator to roam the grounds in search of the activated sprinkler.

SUMMARY

Embodiments of the present disclosure relate to irrigation sprinklers, irrigation systems including the sprinklers and methods of identifying the sprinklers after they have been installed in the ground. One embodiment of the sprinkler includes a base having an interior cavity, a fluid flow path extending through the interior cavity, a valve, a nozzle head, a motorized rotator, memory containing a sprinkler identification code that uniquely identifies the sprinkler, and a transmitter. The valve includes a valve body and a valve element configured to move relative to the valve body to various positions to control a water flow through the fluid flow path. The nozzle head is supported by the base and includes at least one nozzle configured to discharge water received through the fluid flow path. The motorized rotator is configured to rotate the nozzle head about an axis. The transmitter is contained in the interior cavity and configured to wirelessly broadcast the sprinkler identification code.

One example embodiment of the irrigation system includes a group of sprinklers, an irrigation controller and a computing device. Each sprinkler includes a base having an interior cavity, a fluid flow path extending through the interior cavity, a valve including a valve body and a valve element. The valve element is configured to move relative to the valve body to various positions to control a water flow through the fluid flow path, a nozzle head supported by the base and comprising at least one nozzle configured to discharge water received through the fluid flow path, a motorized rotator configured to rotate the nozzle head about an axis, memory containing a sprinkler identification code that is unique to the sprinkler, and a transmitter contained in the interior cavity. The irrigation controller has a wired connection to the group through which electrical power is supplied to the sprinklers. The computing device including a display and is configured to receive a wireless broadcast of the sprinkler identification code of a nearby one of the sprinklers, identify the nearby sprinkler based on the received sprinkler identification code, and display an identification of the nearby sprinkler on the display.

In one example embodiment of the method of identifying individual sprinklers of a group of in-ground sprinklers, each sprinkler wirelessly broadcasts a corresponding sprinkler identification code that uniquely identifies the sprinkler using a transmitter of the sprinkler. A computing device is positioned in close proximity to a nearby one of the sprinklers. The wireless broadcast of the sprinkler identification code of the nearby sprinkler is received using the computing device. An identification is displayed on a display of the computing device of the nearby sprinkler based on the received sprinkler identification code.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Specifically, features disclosed herein with respect to one embodiment may be equally applicable to another. Further, this Summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

FIG. 8 illustrates an example of a sprinkler list that may be displayed on the display of a computing device, in accordance with embodiments of the present disclosure.

DETAILED DESCRIPTION OF ILLUSTRATIVE EMBODIMENTS

Figure 1:
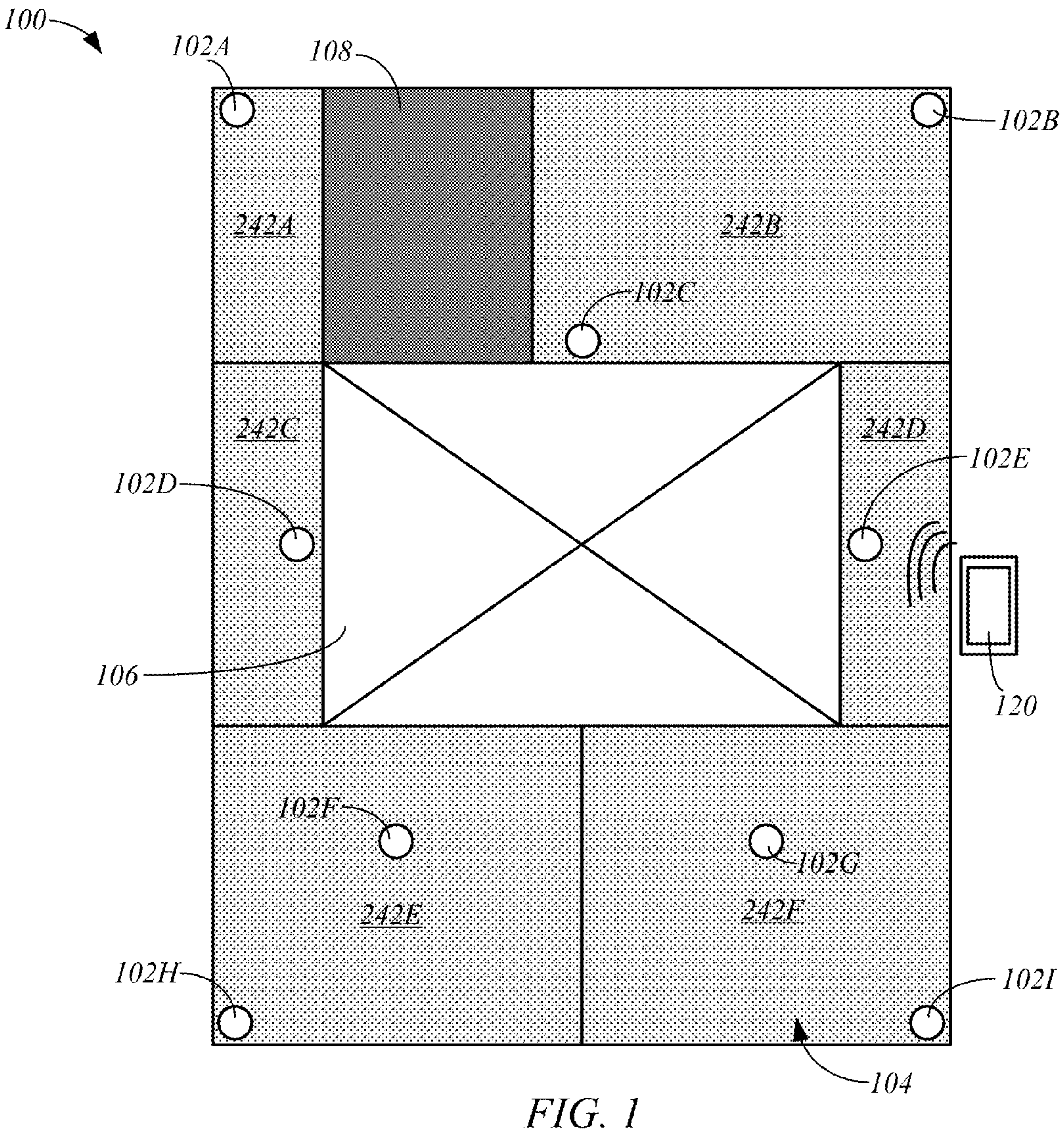
FIG. 1 is a simplified diagram of an example irrigation system that includes multiple sprinklers, in accordance with embodiments of the present disclosure.

Embodiments of the present disclosure are directed to the identification of smart sprinklers of an irrigation system that are installed within the ground. Elements depicted in the drawings having the same or similar reference correspond to the same or similar element.

FIG. 1 is a simplified diagram of an example irrigation system 100 that includes multiple smart sprinklers 102, such as sprinklers 102A-I, that have been installed in the ground, such as in a residential yard 104 around a house 106 and a driveway 108, for example. Each of the sprinklers 102 may be programmed to perform a watering routine on a desired area of the yard having a watering pattern that avoids watering undesired areas and objects, such as the house 106 and the driveway 108, for example.

Figure 2:
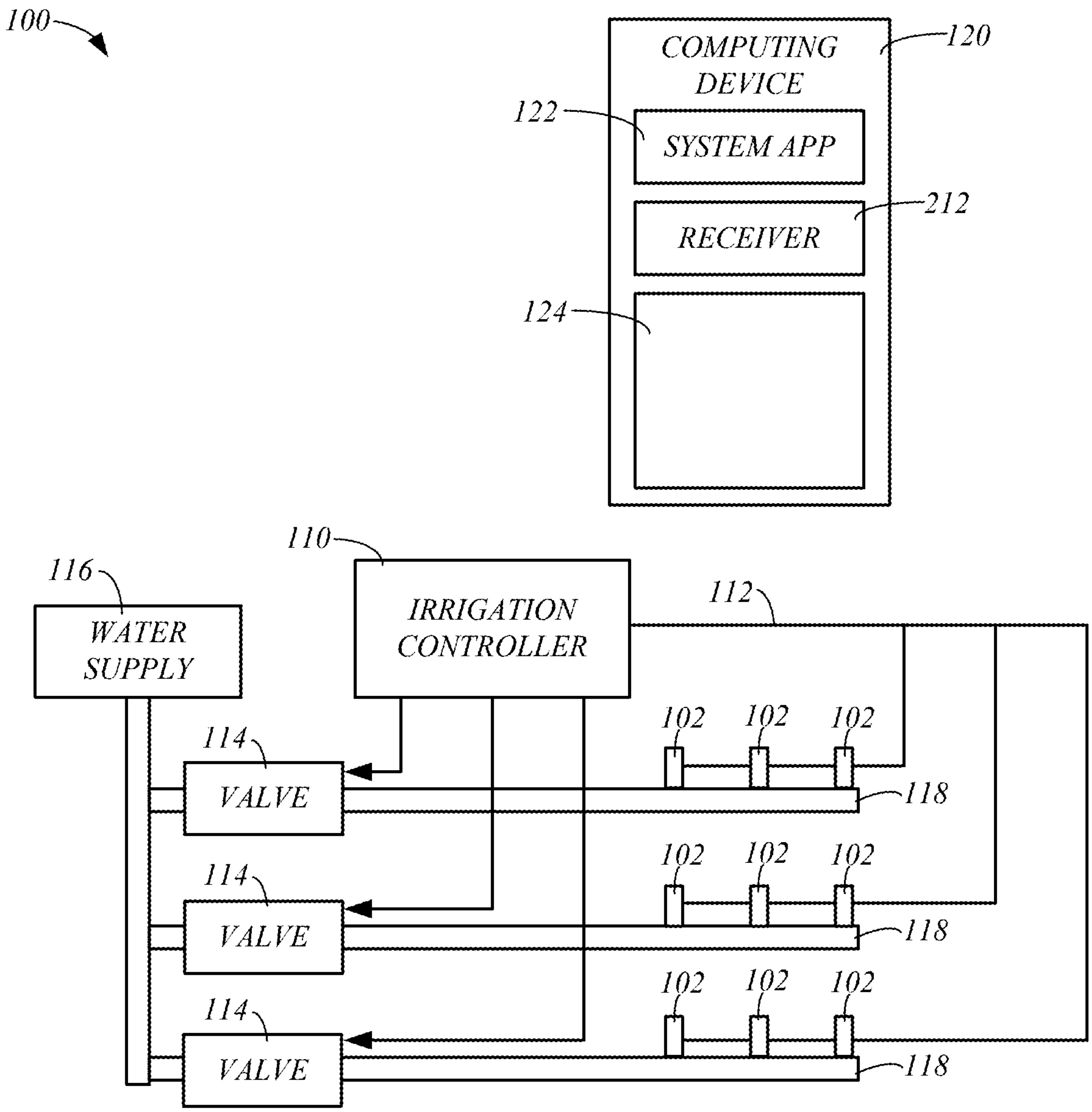
FIG. 2 is a schematic diagram of an irrigation system, in accordance with embodiments of the present disclosure.

FIG. 2 is a schematic diagram of the irrigation system 100, in accordance with embodiments of the present disclosure. The system 100 generally includes the plurality of the smart sprinklers 102 and an irrigation controller 110. The irrigation controller may provide electrical power to each of the sprinklers and communicate with each of the sprinklers through a wired connection 112. For example, the irrigation controller 110 may communicate control signals or watering program instructions to the individual sprinklers 102, and/or receive status and other data from the sprinklers 102, over the wired connection 112.

The system 100 may also include one or more valves 114 that control a flow of water received from a water supply 116 through a corresponding water supply line (e.g., in-ground piping) 118. In one embodiment, the irrigation controller 110 is configured to control the one or more valves 114. Each of the sprinklers 102 may discharge a flow of water received through the supply line 118 in a controlled manner to perform a desired watering operation.

The system may include a computing device 120 that is used to execute a system application 122 for controlling and interacting with the system 100, such as through communications with the irrigation controller 110 using conventional techniques. The computing device 120 may take on a suitable conventional form, such as a smart phone, a laptop, a tablet, or another suitable computing device, and includes a display 124 and a suitable interface (e.g., keyboard, touchscreen, mouse, touchpad, etc.) for interacting with the system application including providing inputs and selections using conventional techniques. The computing device 120 includes a processor that executes instructions (e.g., system application) stored in memory of the computing device to perform one or more functions described herein. In one embodiment, the computing device 120 is in the form of a mobile computing device that allows the installer to position the computing device near each of the installed sprinklers 102 to assist in performing a sprinkler identification process.

Figure 3:
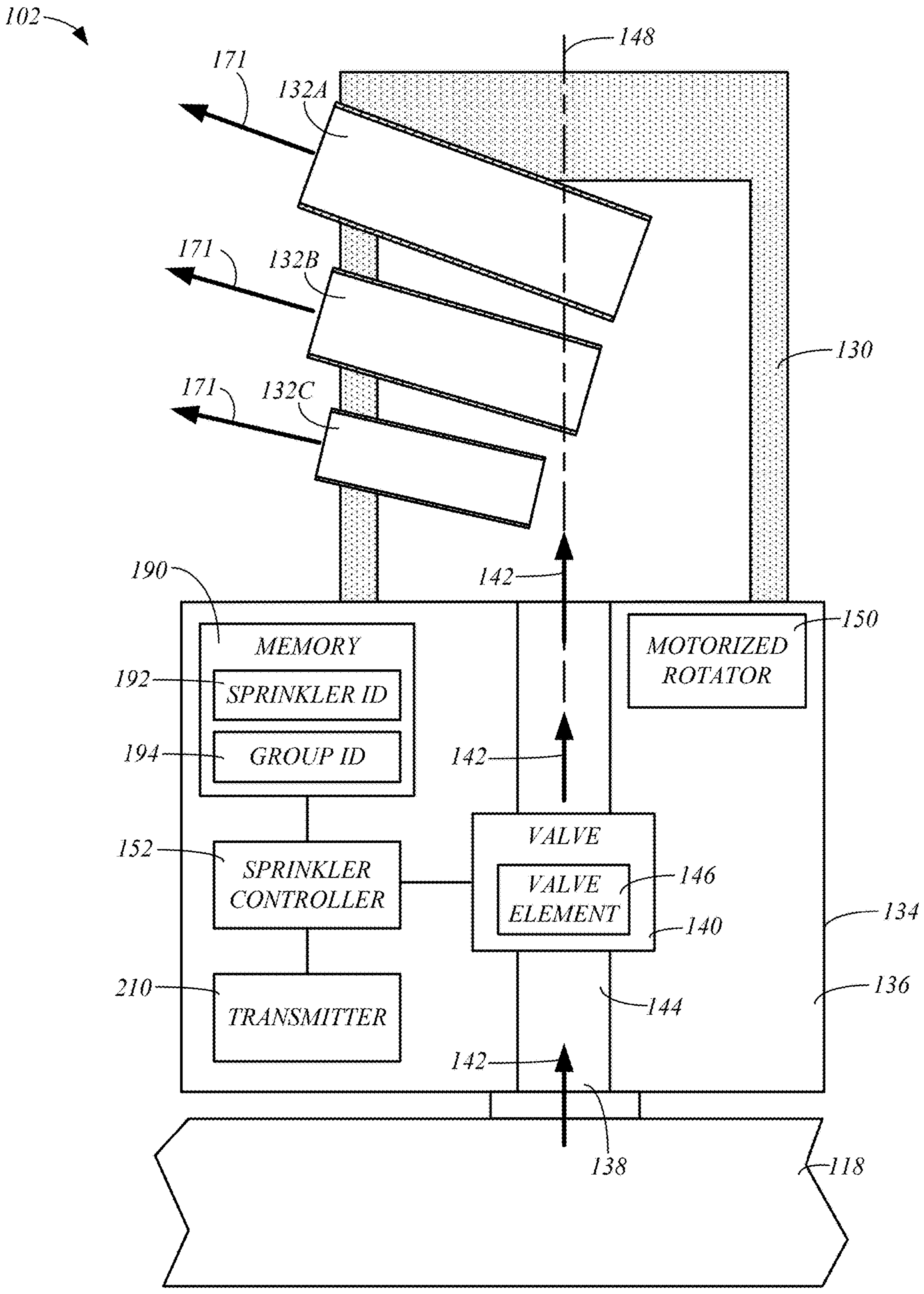
FIG. 3 is a schematic diagram of an example of a sprinkler, in accordance with embodiments of the present disclosure.

FIG. 3 is a schematic diagram of an example of a smart sprinkler 102, in accordance with embodiments of the present disclosure. The sprinkler 102 generally comprises a nozzle head 130 that includes at least one nozzle 132. In one embodiment, the nozzle head 130 includes a plurality of nozzles, such as nozzles 132A-C, as shown in FIG. 3. The sprinkler 102 also includes a base 134 that supports the nozzle head 130. The base 134 includes an interior cavity 136 that may contain various components of the sprinkler 102 and protect the components from water and other environmental conditions.

The sprinkler 102 includes a water supply inlet 138, through which a supplied water flow from the line 118 may be received. A valve 140 controls a water flow 142 from the inlet 138 through a fluid flow path 144 to the nozzles 132. The valve 140 includes a valve element 146 having a position that may be adjusted between fully closed and fully opened positions to control a flow rate of the water flow 142 and a radial distance that water streams are discharged through the nozzles 132. The sprinkler 102 may take the form of a rotary sprinkler, in which the nozzle head 130 is configured to rotate about a vertical axis 148 relative to the base 134 using a suitable motorized rotator 150.

The sprinkler 102 may also include a sprinkler controller 152 that is configured to perform one or more functions of the sprinkler 102. For example, the sprinkler controller may communicate with the irrigation controller 110 over the wired connection 112, relay or translate control signals for the valve 140 and/or the motorized rotator 150, execute a watering program and generate control signals for the valve 140 and/or the motorized rotator 150, and/or perform other functions described herein.

Figure 4:
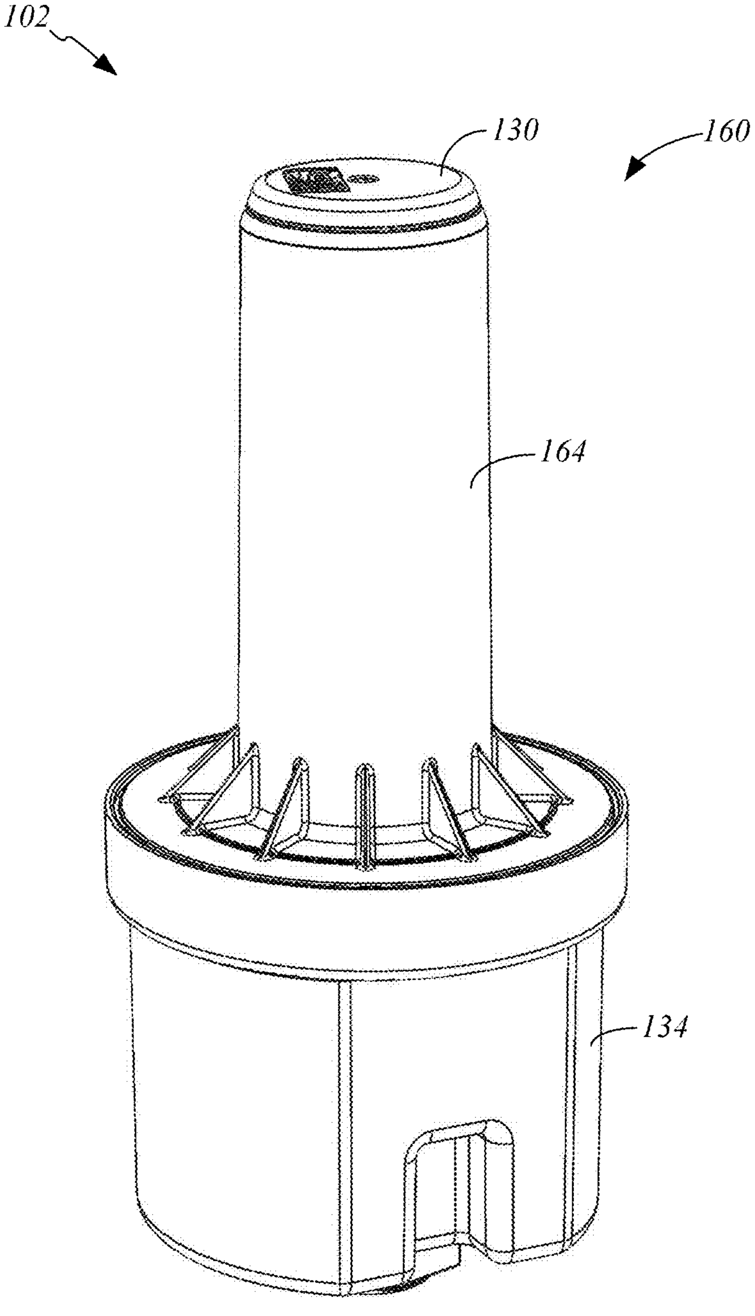
FIGS. 4 and 5 are perspective views of an example of the sprinkler formed in accordance with embodiments of the present disclosure with a nozzle head in lowered and raised positions, respectively.
Figure 5:
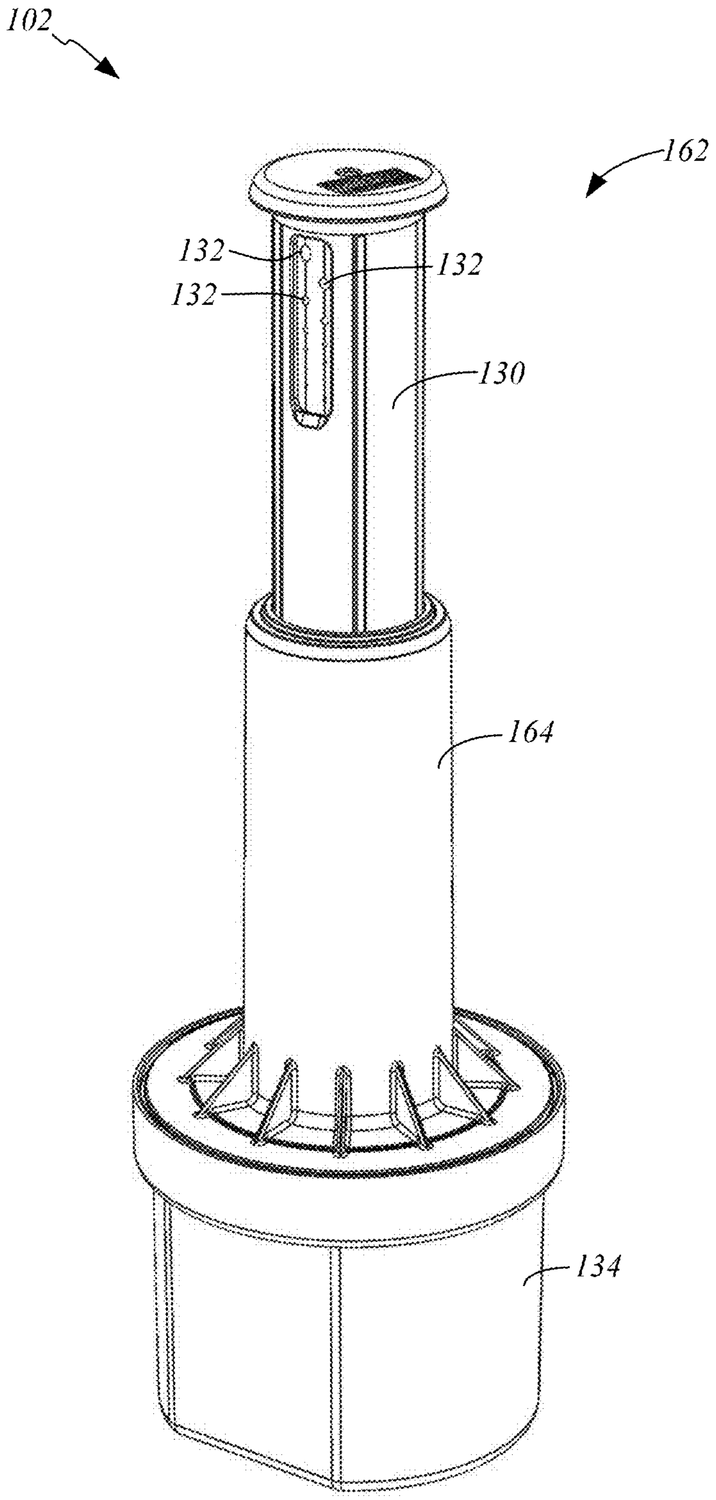

FIGS. 4 and 5 are perspective views of the sprinkler formed in accordance with embodiments of the present disclosure with a nozzle head 130 in a lowered position 160 and a raised position 162, respectively. With the base 134 buried within the ground, the nozzle head 102 is configured to telescope out of the base 134, such as a pedestal 164 of the base 134, from the lowered position 160 to the raised position 162 when a threshold water pressure is applied to an inlet of the nozzle head 130 at the start of a watering operation. The raised position 162 exposes the nozzles 132 allowing them to discharge water streams and perform the watering operation. When the water pressure is removed, the nozzle head 130 recedes within the base 134 to the lowered position 160, in which it is generally located at or just below the ground surface.

Figure 6:
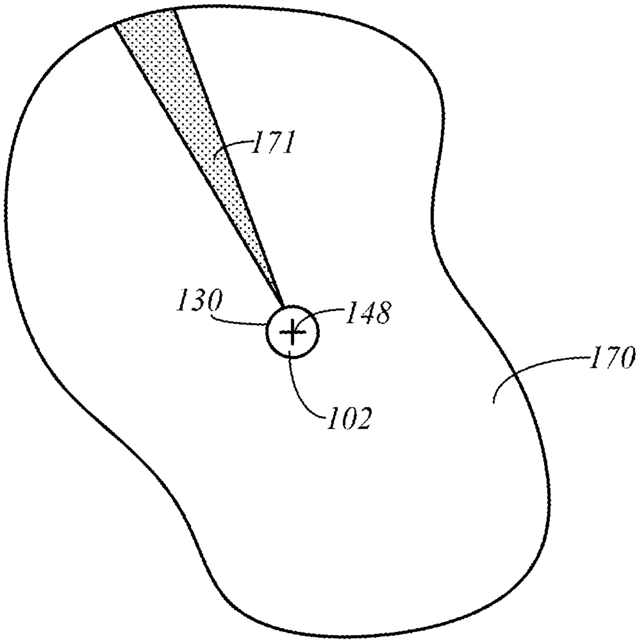
FIG. 6 is a simplified top view of an example watering area that may be watered by a sprinkler, in accordance with embodiments of the present disclosure.

A watering operation may be performed by the sprinkler based on a watering program contained in memory of the system 100, such as memory of the irrigation controller 110 or memory of the sprinkler controller 152, for example. The watering program may include a mapping of positions of the valve element 146 to a given angular orientation of the nozzle head 130 about the axis 148. The watering program may be executed by one or more processors of the system 100, such as a processor of the irrigation controller 110 and/or sprinkler controller 152, to generate control signals for controlling the motorized rotator 150 and the position of the valve element 146 based on the angular position of the nozzle head 130. This allows the sprinkler to water an area 170 that may be non-circular by discharging a water stream 171 having a radial distance that varies as the nozzle head 130 rotates about the axis 148, as indicated in the simplified diagram of FIG. 6.

Figure 7:
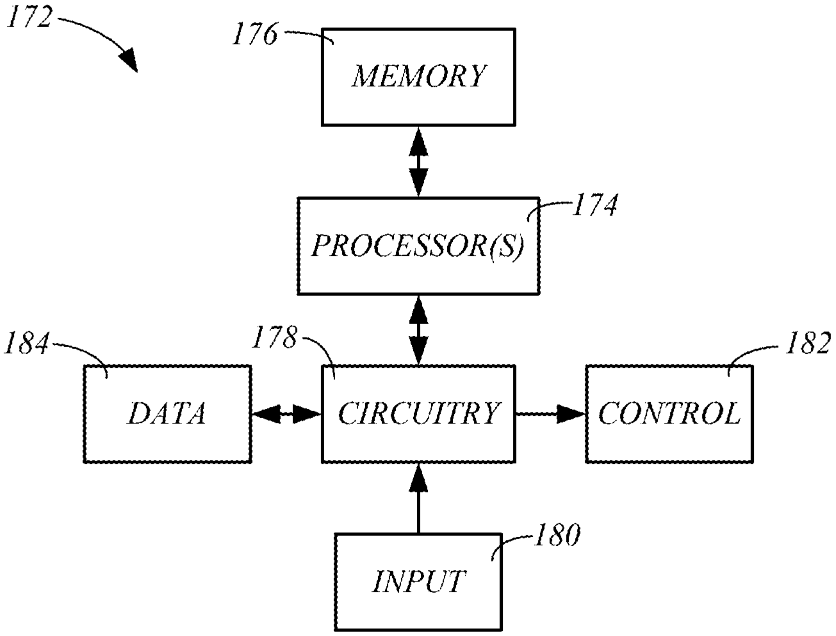
FIG. 7 is simplified diagram of an example of a controller, in accordance with embodiments of the present disclosure.

The irrigation controller 110 and/or the sprinkler controller 152 may take on any suitable form to facilitate the control of the sprinklers 102 to perform desired watering operations and other functions described herein. FIG. 7 is simplified diagram of an example of a suitable controller 172 that may form the controller 110 and/or the controller 152, in accordance with embodiments of the present disclosure.

The controller 172 may include one or more processors 174 and memory 176. The one or more processors 174 are configured to perform various functions of the system 100 described herein, such as the control of the valve 140 and the motorized rotator 150, for example, in response to the execution of instructions contained in the memory 176, such as a watering program.

The one or more processors 174 may be components of one or more computer-based systems, and may include one or more control circuits, microprocessor-based engine control systems, and/or one or more programmable hardware components, such as a field programmable gate array (FPGA). The memory 176 represents local and/or remote memory or computer readable media. Such memory 176 and any other memory mentioned herein comprises any suitable patent subject matter eligible computer-readable media and does not include transitory waves or signals. Examples of the memory 176 include conventional data storage devices, such as hard disks, CD-ROMs, optical storage devices, magnetic storage devices and/or other suitable data storage devices. The controller 172 may include circuitry 178 for use by the one or more processors 174 to receive input signals 180, issue control signals 182 (e.g., signals that control the valve 140, the motorized rotator 150, etc.) and/or communicate data 184, such as in response to the execution of the instructions stored in the memory 176 by the one or more processors 174.

As discussed above, the installation of the system 100 generally involves first installing the sprinklers 102 in the ground at desired locations, then identifying each of the sprinklers 102 and assigning a watering program to the sprinklers 102 based on their location. Some embodiments of the present disclosure facilitate a simplified process of identifying the individual sprinklers 102 of an irrigation system 100 following their installation in the ground.

In one embodiment, each smart sprinkler 102 includes memory 190, which may represent memory of the sprinkler controller 152 or separate memory, which includes a sprinkler identification code (e.g., an 8-bit code) 192. The sprinkler identification code 192 uniquely identifies the sprinkler 102 from other sprinklers 102 of the system 100. The sprinkler identification code 192 may be generated at the time the sprinkler 102 is manufactured, or randomly generated by the sprinkler controller 152 or the irrigation controller 110 when the sprinkler 102 is initialized by the system, for example.

In some embodiments, the irrigation controller 110 receives the sprinkler identification codes 192 from each of the sprinklers 102 connected through the wired connection 112. This may involve, for example, a process of sequentially transmitting 8-bit numbers to the sprinklers 102 using the irrigation controller 110 over the wired connection(s) 112. When one of the 8-bit numbers matches the lower 8-bits of the unique sprinkler identification code 192 of a sprinkler 102, the corresponding sprinkler controller 152 responds by sending back the entire 16-bit sprinkler identification code to the irrigation controller 110 over the wired connection 112. The irrigation controller 110 then adds the found sprinkler 102 to a list of the installed sprinklers under its unique sprinkler identification code 192. The irrigation controller 110 then walks through the remaining 8-bit numbers and adds each responding sprinkler 102 to the list. The irrigation controller walks through the possible lower 8-bits of the 16-bit codes rather than the full 16-bit codes to save time. This example process generally takes about 14 seconds to complete. Other processes may also be used to identify and create a list of the installed sprinklers 102. The computing device 120 may receive the list of the installed sprinklers 102 and the corresponding sprinkler identification codes 192 from the irrigation controller 110 using the system application 122, such as through a conventional wireless communication (e.g., WiFi).

Each of the sprinklers may also include a group identification code 194 contained in the memory 190 that is the same for each of the installed sprinklers 102 of the group. The group identification code 194 may be used by the system application 122 on the computing device 120 to distinguish different sprinkler installations or groups from each other. Thus, the computing device 120 may display a list of the various groups of sprinklers corresponding to their group identification codes. The installer may then select the group from the list of groups to display the list of the sprinklers corresponding to the selected group on the display 124.

FIG. 8 illustrates a simplified example of a sprinkler list 200 of N sprinklers 102 that may be displayed on the display 124 of the computing device 120, in accordance with embodiments of the present disclosure. The list 200 may include the unique sprinkler identification code 202 or a corresponding code or identifier. In one embodiment, the list 200 includes an editable entry 204 for each sprinkler in the list 200, which the installer may provide a custom identifier of each sprinkler, such as a location description. For example, an installer may label the sprinklers in the list 200 as “FRONT YARD EAST CORNER”, “BACK YARD CENTER”, or another suitable description. However, as discussed below, this location description is generally entered following or during a sprinkler identification process.

In one embodiment, each sprinkler 102 includes a transmitter 210 that is contained in the interior cavity 136 of the base 134, as indicated in FIG. 3 The transmitter 210 is configured to wirelessly broadcast the sprinkler identification code 192 to facilitate identification of the sprinkler 102 by the installer.

The transmitter 210 may take on any suitable form. In one example, the transmitter 210 comprises a conventional Bluetooth® transmitter that is configured to wirelessly broadcast the sprinkler identification code 192 in accordance with a Bluetooth® communication protocol. Alternatively, the transmitter 210 may operate to broadcast the sprinkler identification code 192 using a near-field communication protocol, or another suitable wireless communication protocol, for example.

The broadcast of the sprinkler identification codes 192 by the transmitters 210 of the system 100 may be initiated in response to receiving power over the wired connection 112 or a command received from the irrigation controller 110, for example. The power or command from the irrigation controller 110 may be triggered by the installer using the computing device 120. In one embodiment, all of the sprinklers 102 broadcast their corresponding sprinkler identification codes 192 simultaneously. Alternatively, the installer may use the computing device 120 to trigger any one of the sprinklers 102 in the list to broadcast its sprinkler identification code 192.

The computing device 120 includes a conventional receiver 212 (FIG. 2) for receiving the broadcasts from the transmitters 210 of the sprinklers 102. Thus, the receiver 212 may comprise a conventional Bluetooth® receiver, a near-field communications receiver, or another type of receiver that allows for the reception of the sprinkler identification codes 192 broadcast by the transmitters 210 of the sprinklers 102.

Figure 9:
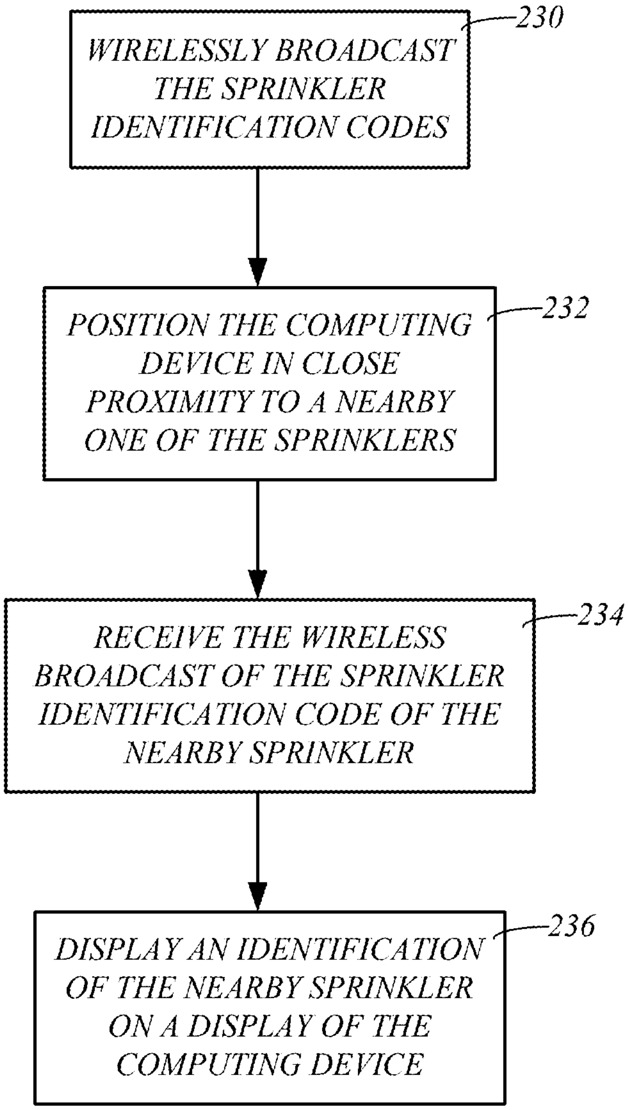
FIG. 9 is a flowchart illustrating a method of identifying individual in-ground sprinklers, in accordance with embodiments of the present disclosure.

FIG. 9 is a flowchart illustrating a method of identifying individual in-ground sprinklers 102, such as the sprinklers 102 of the group shown in FIG. 1. Initially, the sprinkler list 200 (FIG. 8) may include the sprinkler identification codes 202 for the group, but the location descriptions may either be cleared or contain default values. The identification process is used to allow the installer to identify the particular location of each in-ground sprinkler 102 of the installation. The installer may then develop a watering program for each of the sprinklers 102, such as using the system application 122.

At 230, each of the sprinklers 102 of the group wirelessly broadcasts its sprinkler identification code 192 using its transmitter 210, such as using a Bluetooth® communication protocol, for example. As mentioned above, step 230 may be initiated through a command from the irrigation controller 110, which may be triggered by the installer through the system application 122 on the computing device 120. Alternatively, the sprinklers 102 may be individually commanded to broadcast their sprinkler identification codes 192 one at a time. One advantage to the group broadcast of the sprinkler identification codes 192 is that it eliminates the need for the installer to roam the property in search of the broadcasting sprinkler 102. Instead, the installer may approach any one of the sprinklers 102 to perform an identification, as described below.

Since the transmitters 210 of the in-ground sprinklers 102 are located beneath the ground, each broadcast sprinkler identification code signal is at least partially obstructed by the ground and components of the sprinkler 102. This attenuates the broadcast signal and requires the computing device 120 to be placed in close proximity to a sprinkler 102 before it can receive a sprinkler identification code signal that is above a threshold level. This broadcast signal attenuation is used advantageously in the sprinkler identification process to isolate the sprinklers 102 from each other and avoid the simultaneous reception of similar level broadcast signals. For example, the distance (e.g., 2-6 feet) at which the computing device may receive one of the broadcast sprinkler identification code signals at a level that is above a threshold level is substantially less (e.g., 50%) than the distance separating the sprinklers (e.g., 15-40 feet). As a result, the installer may assume that a received broadcast of a sprinkler identification code 192 corresponds to the nearest sprinkler.

Accordingly, at 232 of the method the installer places the computing device 120 in close proximity (e.g., within 2-6 feet) to a nearby one of the sprinklers 102 (see, e.g., FIG. 1) and, at 234 the wireless broadcast of the sprinkler identification code 192 is received by the receiver 212 of the computing device 120.

In one embodiment, in the event the computing device 120 receives more than one broadcast sprinkler identification code signal, the system application 122 may distinguish the signals from each other based on the relative strengths of the signals or based on whether any one of the signals has a strength or level that is above a predetermined threshold value. The stronger signal and/or the signal that is above the threshold value is identified as corresponding to the nearby sprinkler 102, and the other signal may be ignored.

For example, in step 232, the installer may position the computing device 120 in close proximity to sprinkler 102E, as indicated in FIG. 1. Due to the distance separating the computing device 120 from the other sprinklers 102, the receiver 212 of the computing device 120 either cannot receive the broadcast signals from the nearest other sprinklers, such as sprinklers 102B, 102C or 102G, or the broadcast signals from those sprinklers have a level that is lower than that of the signal broadcast by the sprinkler 102E and/or lower than a predetermined threshold level.

At 236 of the method, an identification of the nearby sprinkler 102 is displayed on the display 124 of the computing device 120. This identification may take on any suitable form and generally allows the installer to distinguish the nearby sprinkler 102 from other sprinklers 102 presented on the display. In one example, the system application 122 displays the list 200 of the sprinklers 102, and the listed sprinkler having the sprinkler identification code 192 that matches the code received at step 234 is identified in a manner that distinguishes its listing from the other listed sprinklers, such as by graphically highlighting the identified sprinkler (e.g., change of color, bold text, a symbol, etc.).

For example, when the nearby sprinkler 102 has the identification code "003", step 236 may highlight the corresponding sprinkler in the list, as indicated in FIG. 8. The installer may then edit the corresponding editable entry 204 in the list 200 to provide a descriptive label for the identified sprinkler 102, such as "EAST SIDE OF HOUSE", and the transmitter 210 of the identified sprinkler 102 may be deactivated.

The installer may continue the method by repeating the steps 232, 234 and 236 while at least the unidentified sprinklers continue to broadcast their sprinkler identification codes 192, until all of the sprinklers 102 in the group have been identified. The sprinkler list 200 may be updated as each sprinkler 102 is identified to include a descriptive label 204.

In one embodiment, the system application 122 allows the installer to associate each identified sprinkler 102 with a sub-group 240, as is indicated in the example sprinkler list 200 of FIG. 8. The sub-groups may correspond to groups of sprinklers that are in a similar location (e.g. zones 242A-F shown in FIG. 1) and/or may perform their watering operations simultaneously, for example.

Although the present disclosure has been described with reference to preferred embodiments, workers skilled in the art will recognize that changes may be made in form and detail without departing from the spirit and scope of the invention.

Functions recited herein may be performed by a single controller or processor, multiple controllers or processors, or at least one controller or processor. As used herein, when one or more functions are described as being performed by a controller (e.g., a specific controller), one or more controllers, at least one controller, a processor (e.g., such as a specific processor), one or more processors or at least one processor, embodiments include the performance of the function(s) by a single controller or processor, or multiple controllers or processors, unless otherwise specified. Furthermore, as used herein, when multiple functions are performed by at least one controller or processor, all of the functions may be performed by a single controller or processor, or some functions may be performed by one controller or one processor, and other functions may be performed by another controller or processor. Thus, the performance of one or more functions by at least one controller or processor does not require that all of the functions are performed by each of the controllers or processors.

What is claimed is:

1. A sprinkler comprising:

a base having an interior cavity;

a fluid flow path extending through the interior cavity;

a valve including a valve body and a valve element, the valve element is configured to move relative to the valve body to various positions to control a water flow through the fluid flow path, the valve configured to receive power through a wired connection;

a nozzle head supported by the base and comprising at least one nozzle configured to discharge water received through the fluid flow path;

a motorized rotator configured to rotate the nozzle head about an axis;

memory containing a sprinkler identification code that uniquely identifies the sprinkler;

and a transmitter contained in the interior cavity and configured to receive power through the wired connection and wirelessly broadcast the sprinkler identification code in response to receiving the power over the wired connection or in response to receiving a command over the wired connection.

2. The sprinkler according to claim 1, wherein the transmitter is configured to broadcast the sprinkler identification code in response to receiving the power over the wired connection.

3. The sprinkler according to claim 1, wherein the transmitter is configured to broadcast the sprinkler identification code in response to receiving the command over the wired connection.

4. The sprinkler according to claim 1, wherein the transmitter comprises a Bluetooth® transmitter and is configured to wirelessly broadcast the identification code in accordance with a Bluetooth® communication protocol.

5. The sprinkler according to claim 1, including a sprinkler controller contained within the interior cavity and comprising a processor, the sprinkler controller configured to generate control signals that adjust the position of the valve element in response to execution of an irrigation program stored in the memory using the processor.

6. The sprinkler according to claim 1, wherein:

control signals are received over a wired connection from a remote irrigation controller; and the position of the valve element is adjusted in response to the control signals.

7. The sprinkler according to claim 1, wherein the memory contains a group identification code that uniquely identifies a group of sprinklers.

8. A sprinkler system comprising:

a group of sprinklers, each sprinkler comprising:

a base having an interior cavity;

a fluid flow path extending through the interior cavity;

a valve including a valve body and a valve element, the valve element is configured to move relative to the valve body to various positions to control a water flow through the fluid flow path;

a nozzle head supported by the base and comprising at least one nozzle configured to discharge water received through the fluid flow path;

a motorized rotator configured to rotate the nozzle head about an axis;

memory containing a sprinkler identification code that is unique to the sprinkler;

and a transmitter contained in the interior cavity and configured to wirelessly broadcast the sprinkler identification code;

an irrigation controller having a wired connection to the group of sprinklers through which electrical power is supplied to the group of sprinklers;

and a computing device including a display, the computing device configured to:

receive a wireless broadcast of the sprinkler identification code from the transmitter of a nearby sprinkler of the group of sprinklers;

identify the nearby sprinkler based on the received sprinkler identification code and a strength of the received wireless broadcast;

and display an identification of the nearby sprinkler on the display.

9. The sprinkler system according to claim 8, wherein each transmitter comprises a Bluetooth® transmitter and is configured to wirelessly broadcast the sprinkler identification code in accordance with a Bluetooth® communication protocol.

10. The sprinkler system according to claim 8, wherein the computing device is configured to display a list of each sprinkler of the group of sprinklers on the display.

11. The sprinkler system according to claim 10, wherein:

the memories of the group of sprinklers each include a group identification code that uniquely identifies the group of sprinklers;

and the computing device is configured to display the list based on the group identification codes.

12. The sprinkler system according to claim 10, wherein the list includes the sprinkler identification codes.

13. The sprinkler system according to claim 8, wherein the computing device is configured to associate the nearby sprinkler to one of a plurality of sub-groups of the group of sprinklers in response to a user input.

14. A method of identifying individual sprinklers of a group of in-ground sprinklers, each sprinkler comprising:

a base having an interior cavity;

a fluid flow path extending through the interior cavity;

a valve including a valve body and a valve element, the valve element is configured to move relative to the valve body to various positions to control a water flow through the fluid flow path, the valve receiving power through a wired connection;

a nozzle head supported by the base and comprising at least one nozzle configured to discharge water received through the fluid flow path;

a motorized rotator configured to rotate the nozzle head about an axis;

memory containing a sprinkler identification code that is unique to the sprinkler;

and a transmitter contained in the interior cavity and receiving power through the wired connection;

the method comprising steps of:

each sprinkler of the group of in-ground sprinklers wirelessly broadcasting its sprinkler identification code that uniquely identifies the sprinkler using the transmitter of the sprinkler in response to receiving the power over the wired connection or in response to receiving a command over the wired connection;

positioning a computing device in close proximity to a nearby sprinkler of the group of in-ground sprinklers;

receiving the wireless broadcast of the sprinkler identification code of the nearby sprinkler using the computing device;

and displaying an identification on a display of the computing device of the nearby sprinkler based on the received sprinkler identification code.

15. The method according to claim 14, including associating the identified nearby sprinkler with a sub-group of the group of in-ground sprinklers using the computing device in response to a user input.

16. The method according to claim 14, wherein the identification is displayed based on a strength of the received wireless broadcast.

17. The method according to claim 14, wherein:

each transmitter comprises a Bluetooth® transmitter; and wirelessly broadcasting the sprinkler identification code comprises wirelessly broadcasting the sprinkler identification code in accordance with a Bluetooth® communication protocol.

18. The method according to claim 14, wherein: the memory of each sprinkler comprises a group identification code that uniquely identifies the group of in-ground sprinklers; the method includes displaying a list of each sprinkler of the group of in-ground sprinklers based on the group identification codes; and displaying the identification comprises displaying the identification in the list.

* * * * *